Feb. 5, 1963   R. L. CARDEN ETAL   3,076,857
PRODUCTION OF DIALKYLNAPHTHALENES
Filed Aug. 27, 1959
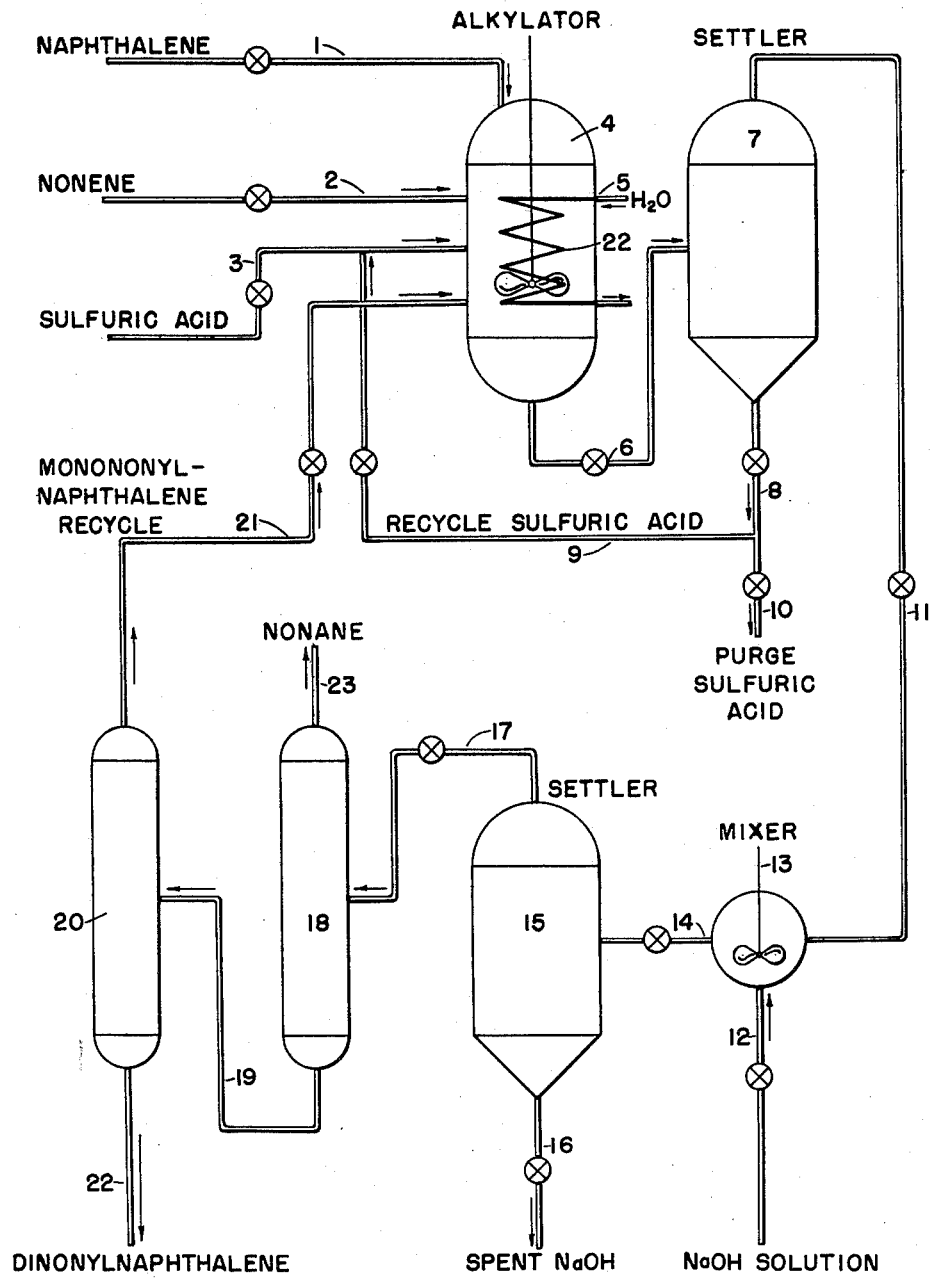
INVENTORS
ROBERT L. CARDEN
GEORGE C. FEIGHNER
DAVID W. MARSHALL
BY H. H. Huth
ATTORNEY 3,076,857
PRODUCTION OF DIALKYLNAPHTHALENES
Robert L. Carden, Poteau, and George C. Feighner and David W. Marshall, Ponca City, Okla., assignors to Continental Oil Company, Ponca City, Okla., a corporation of Delaware
Filed Aug. 27, 1959, Ser. No. 836,414
9 Claims. (C. 260—671)

The present invention relates to an improved process for the production of dialkylnaphthalenes. More particularly, it relates to an improved method for the production of dinonylnaphthalene, whereby by-product monononylnaphthalene may be utilized.

The use of oil-soluble sulfonates as detergents in lubricating oils has been practiced for several years. Initially, the mahogany sulfonates were used almost exclusively. More recently, sulfonates of postdodecylbenzene, which is a by-product of the manufacture of dodecylbenzene, have been used. Both of these materials, when subjected to proper treatment have been very satisfactory for this purpose. However, the demand for oil-soluble sulfonates has been increasing at such a rate that it would be advantageous to have available other sulfonatable materials. The dialkylnaphthalenes, and in particular those having molecular weights in the range of dinonylnaphthalene and above, are excellent materials for this purpose.

The prior art processes for the alkylation of naphthalene have been concerned, primarily, with the production of monoalkylnaphthalenes. In fact, dialkylnaphthalenes have often been regarded as undesirable. The converse is true where it is desired to produce a raw material for preparing oil-soluble sulfonates. It is highly desirable to have a process which gives a high yield of dialkylnaphthalenes. In addition, it is desirable to use a low-cost material as a catalyst in the alkylation reaction.

The production of dialkylnaphthalenes by the alkylation of an olefin with naphthalene usually produces substantial quantities of monoalkylnaphthalenes. This is true even in processes where dialkylnaphthalenes are produced in substantial yields. These monoalkylnaphthalenes are undesirable even though uses are known for them. For example, the dialkylnaphthalenes plant may be located at a great distance from the plants which consume monoalkylnaphthalenes. It is readily apparent that a means for utilizing these monoalkylnaphthalenes is quite desirable. In some instances, the utilization of the monoalkylnaphthalenes may mean the difference between an economical process and one that is not.

It is an object of the present invention to provide a process for the production of dialkylnaphthalenes in high yields. It is another object of the present invention to provide such a process whereby the by-product monoalkylnaphthalenes can be utilized. It is still another object of the present invention to provide such a process using an economical catalyst. Other objects and advantages of the invention will become apparent from the following description thereof.

Broadly stated, the present invention provides a process for the production of dialkylnaphthalenes, in which the process comprises the steps of:

(a) adding to a reaction zone, while maintaining the temperature at 0 to 15° C., naphthalene, monoalkylnaphthalenes, and a controlled amount of concentrated sulfuric acid, (b) adding, while agitating, an olefin to the reaction mixture while maintaining the temperature at 0 to 15° C., (c) recovering from the reaction mass paraffinic hydrocarbon, naphthalene, monoalkylnaphthalenes, and dialkylnaphthalenes.

In a particularly suitable embodiment the mononylnaphthalene fraction of step (c) is recycled to step (a).

In a preferred embodiment the olefinic hydrocarbon is nonene, with dinonylnaphthalene being the desired product.

Before proceeding to specific examples which illustrate our invention, it is desirable first, to define the materials and operating conditions of our invention. For the sake of brevity, the abbreviations MNN and DNN will be employed to represent monononylnaphthalene and dinonylnaphthalene, respectively.

Generally, any grade of naphthalene may be used in our invention. Obviously, the better grades will give a purer product. We prefer to use a semi-purified grade, which is known commercially as 78° naphthalene.

The preferred olefin for our invention is nonene and, in particular, that produced by the polymerization of propene, using phosphoric acid-kieselguhr catalyst at about 400° F. and 1,000 p.s.i.g. The catalytic polymerization of propylene resulting in the formation of by-product nonene is illustrated in the patent to Grote et al., U.S. Patent No. 2,457,146, the nonene being described therein as low-boiling polymer ($C_6$—$C_{12}$), a portion of which is recycled through line 32, and the remainder of which is withdrawn through line 33. The "true" nonene portion is highly branched and contains tertiary carbon atoms. The following physical properties are typical of the nonene we prefer to use:

| | |
|---|---|
| A.P.I. gravity | 62.2 |
| Initial boiling point | 127° F. |
| 10% | 240° F. |
| 50% | 274° F. |
| 90% | 303° F. |
| End point | 326° F. |

Mass spectrometer analysis of two typical nonene samples are shown in Table I.

TABLE I

*Mass Spectrometer Analysis of Nonene Samples*

| Compound | Sample | |
|---|---|---|
| | A | B |
| | (Liquid Volume, percent) | |
| $C_5$ and less | 2.7 | |
| $C_6$ | 3.0 | |
| $C_7$ | 7.2 | 7.0 |
| $C_8$ | 12.8 | 14.7 |
| $C_9$ | 45.3 | 55.5 |
| $C_{10}$ | 23.1 | 19.1 |
| $C_{11}$ | 5.4 | 3.4 |
| $C_{12}$ | 0.5 | 0.3 |

It is to be understood that this is typical, and we do not intend to be limited thereby. Olefins having physical properties other than these are also suitable.

With regard to the amount of olefin, we prefer to use the theoretical olefin to naphthalene ratio, or 2 to 1. Ratios ranging from about 1 to 1 to about 3 to 1 are suitable, but a decreased yield of DNN results.

The monoalkylnaphthalene used in our process corresponds to the olefin used. Accordingly, it is usually MNN. This material is not a pure compound, but is characterized by a boiling point range. Generally, the MNN is the material distilling between 175° C. at 100 mm. Hg pressure to 250° C. at 20 mm. Hg pressure. A suitable range of MNN to naphthalene, on a molar basis, is 0.10 to 2.0, with a preferable range being from 0.25 to 1.0. Generally, all of the MNN is recycled to a succeeding batch.

The concentrated sulfuric acid, which is used as a catalyst in our process can vary in strength from 92 to 98 percent (weight), with 95 to 97 percent acid being preferred. It is of particular interest that we have discovered that the sulfuric acid from a reaction may be used a second time without fortification but may not be used for a third reaction without being fortified.

The recycle of MNN is an advantageous feature of our process in that it provides for the utilization of the MNN. It should be noted, however, that the use, or recycle, of the MNN unexpectedly requires an amount of sulfuric acid catalyst which is outside of the range normally used without the MNN recycle. The reason for this is not clear. It would be expected that the alkylation of naphthalene with nonene would proceed stepwise; the first step being alkylation of naphthalene with nonene to give MNN; and the second step being alkylation of MNN with nonene to give DNN. Accordingly, it would be expected that MNN could be alkylated under the same conditions as the alkylation of nonene with naphthalene. We did not find this to be true. It will be apparent from the examples that a different quantity of sulfuric acid is required when MNN is present.

With regard to the amount of sulfuric acid to be used, we have found a suitable range to be 1.2 to 2.0 parts, by weight, of sulfuric acid per part of nonene. A preferred range is 1.4 to 1.8 parts of sulfuric acid per part of nonene. Expressed on another basis, when using 2 moles of nonene per mole of naphthalene, the sulfuric acid to naphthalene ratio is from 2.3 to 3.9. When using the suitable range of nonene, 1 to 3 moles per mole of naphthalene, the sulfuric acid range is from 1.2 to 5.9 moles per mole of naphthalene.

It is known that high temperatures must not be used when using sulfuric acid as an alkylation catalyst. Otherwise, sulfonation of the aromatic hydrocarbon occurs. We have found a suitable temperature range for our process to be 0 to 15° C., with a preferable temperature range being 5 to 10° C.

The process of our invention may be practiced in both a batch and a continuous operation. The accompanying drawing illustrates, in diagrammatic form, apparatus and procedure suitable for carrying out the invention on a continuous basis.

Referring to the drawing, naphthalene, nonene, sulfuric acid and recycle mononoylnaphthalene are fed, at predetermined and controlled rates, through lines 1, 2, 3 and 21 respectively, to the alkylator 4. The alkylator 4 is equipped with an agitator 22 and coils 5 for circulating water for controlling the reaction temperature. From the alkylator the reaction mixture passes through line 6 to a settler 7, where the major part of the sulfuric acid layer settles out. The sulfuric acid is withdrawn from the settler 7 through line 8. Sulfuric acid suitable for re-use goes through line 9 to line 3 and then to the alkylator 4. Unsuitable sulfuric acid goes from line 8 to line 10 and thence to a tank for refortification. The remaining reaction mixture goes from the settler 7 through line 11 to a mixture 13 where it is contacted with a NaOH solution to neutralize any remaining sulfuric acid. The reaction mixture then passes through line 14 to a settler 15. Spent NaOH and sodium sulfate are withdrawn from the settler through line 16. The reaction mixture passes through line 17 to a fractionating column where the nonane and water are removed through line 23. The material then goes through line 19 to a second fractionating column 20 where the mononoylnaphthalene recycle is removed through line 21 and returned to the alkylator 4. The dinonylnaphthalene fraction is removed by way of line 22.

In order to disclose more clearly the nature of the present invention and the advantages thereof, reference will hereinafter be made to certain specific embodiments which illustrate the flexibility of the herein-described process. It should be clearly understood, however, that this is done solely by way of example and is not to be construed as a limitation upon the spirit and scope of the appended claims.

EXAMPLE I

A. This example shows the alkylation of nonene with naphthalene using sulfuric acid as the catalyst under the following conditions: (1) 2 to 1 mole ratio of nonene to naphthalene, and (2) absence of MNN.

Charge:
 500 grams nonene
 255 grams naphthalene
 460 grams 96.5% sulfuric acid

Procedure:
The sulfuric acid was added to the reaction flask. While keeping the temperature at about 5° C., the naphthalene was added to the acid, forming a slurry. The nonene was then added to the vigorously stirred mixture over a period of one hour while maintaining the temperature at 5 to 10° C. The mixture was then stirred for 30 minutes, followed by the addition of 550 grams of benzene to facilitate settling of the sulfuric acid layer. The hydrocarbon layer was washed with dilute aqueous caustic. It was then distilled on a 10 plate column taking the following fractions:

Nonane _____ to 175° C. at 1 atm.
Naphthalene _____ to 175° C. at 100 mm. Hg.
MNN _____ to 250° C. at 20 mm. Hg.
DNN _____ bottoms.

Products:
 Nonane _____ 13.4 g. (by difference in amt. of benzene).
 Naphthalene _____ 42 g.
 MNN _____ 132 g.
 DNN _____ 844 g.
 Loss and holdup _____ 10 g.
 DNN/nonene ratio __ 0.77.

B. The procedure of A was repeated using the same charge. The following yields were obtained:
 Nonane _____ 20.6 g.
 Naphthalene _____ 26.6 g.
 MNN _____ 190 g.
 DNN _____ 374 g.
 Loss and holdup _____ 23.8 g.
 DNN/nonene ratio _____ 0.75

EXAMPLE II

This example shows the alkylation of nonene with naphthalene using sulfuric acid as the catalyst under the following conditions: (1) 3 to 1 mole ratio of nonene to naphthalene, (2) absence of MNN, and (3) recycle of sulfuric acid.

Charge:

| Run No. | A | B | C |
|---|---|---|---|
| Naphthalene, g | 169 | 169 | 169 |
| Nonene, g | 500 | 500 | 500 |
| 96.5% Sulfuric Acid, g | 350 | a 391 | b 410 | a Acid layer from Run No. A.
b Acid layer from Run No. B.

Procedure: Similar to that in Example I—A.

Products:

| Run No. | A | B | C |
|---|---|---|---|
| Nonane, g | 7.3 | 9.3 | 2.7 |
| Naphthalene, g | 17.5 | 32.3 | 32.6 |
| MNN, g | 147.2 | 160.2 | 356.2 |
| DNN, g | 370 | 370.1 | 164.2 |
| Loss and Holdup | 8.2 | 4.8 | 8.8 |
| DNN/Nonene Ratio | 0.74 | 0.74 | 0.33 |

EXAMPLE III

This example shows the alkylation of nonene with naphthalene using sulfuric acid as the catalyst under the following conditions: (1) 3 to 1 mole ratio of nonene to naphthalene, (2) use of hexane as a solvent, and (3) use of varying amounts of sulfuric acid.

Charge:

| Run No. | A | B |
|---|---|---|
| Naphthalene, g | 169 | 169 |
| Nonene, g | 500 | 500 |
| 96.5% Sulfuric Acid, g | 350 | 175 |
| Hexane, g | 300 | 300 |

Procedure:

The naphthalene and hexane were placed in a reaction flask, forming a slurry, with part of the naphthalene being in solution. The contents of the flask were cooled to below 5° C., whereupon the sulfuric acid was added, still keeping the temperature below 10° C. The nonene was then added to the vigorously stirred mixture over a period of forty-five minutes while maintaining the temperature at 0 to 5° C.

The remainder of procedure was similar to that in Example I—A.

Products:

| Run No. | A | B |
|---|---|---|
| Nonane, g | 18.3 | 6.6 |
| Naphthalene, g | 16.8 | 16.5 |
| MNN, g | 200.8 | 276 |
| DNN, g | 282 | 232 |
| Loss and Holdup |  | 24.6 |
| DNN/Nonene ratio | 0.56 | 0.46 |

EXAMPLE IV

This example shows the alkylation of nonene with naphthalene using sulfuric acid as the catalyst under the following conditions: (1) 2 to 1 mole ratio of nonene to naphthalene, (2) presence of MNN, and (3) amount of sulfuric acid same as in Example I.

Charge:
  500 grams nonene
  255 grams naphthalene
  110 grams MNN
  460 grams 96.5% sulfuric acid Procedure:

The sulfuric acid was added to the reaction flask and cooled to below 10° C. The naphthalene was then added, followed by the addition of the MNN, keeping the temperature below 10° C. The nonene was then added to the vigorously stirred mixture over a period of one hour while maintaining the temperature between 9 and 12° C.

The remainder of the procedure was similar to that in Example I—A.

Products:
  Nonane, g. _____ 62.6
  Naphthalene, g. _____ 25.4
  MNN, g. _____ 242
  DNN, g. _____ 354
  Loss and holdup _____ 12.9
  DNN/nonene ratio _____ 0.71

EXAMPLE V

This example shows the alkylation of nonene with MNN using varying amounts of MNN and varying amounts of sulfuric acid as the catalyst.

Charge:

| Run No. | A | B |
|---|---|---|
| MNN, g | 252 | 504 |
| Nonene, g | 510 | 510 |
| 96.5% Sulfuric Acid, g | 350 | 685 |

Procedure: Same as in Example I—A, except MNN was substituted for naphthalene.

Products:

| Run No. | A | B |
|---|---|---|
| Nonane, g | 26.8 | 6.8 |
| Naphthalene, g | 34 | 4.6 |
| MNN, g | 232 | 253 |
| DNN, g | 235 | 602 |
| DNN/Nonene Ratio | 0.46 | 1.18 |

EXAMPLE VI

This example shows the alkylation of nonene with naphthalene using sulfuric acid as the catalyst under the following conditions: (1) 3 to 1 mole ratio of nonene to naphthalene, (2) presence of MNN, and (3) 1.4 parts (weight) of sulfuric acid per part of nonene. The average of five runs is shown.

Charge:
  500 grams nonene
  169 grams naphthalene
  700 grams 96.5% sulfuric acid
  240 grams MNN Procedure: Similar to that in Example IV.

Products:
  Nonane, g. _____ 99.9
  Naphthalene, g. _____ 33.8
  Mnn, g. _____ 279
  DNN, g. _____ 377
  Loss and holdup, g. _____ 25.2
  DNN/nonene ratio _____ 0.75

EXAMPLE VII

This example shows the alkylation of nonene with naphthalene using sulfuric acid as the catalyst under the following condition: (1) 2 to 1 mole ratio of nonene to naphthalene, (2)) presence of MNN (recycled to next alkylation) and (3) 1.39 parts (weight) of sulfuric acid per part of nonene. The average of four runs is shown.

Charge:
  504 grams nonene
  256 grams naphthalene
  329 grams MNN (recycle)
  700 grams 96.5% sulfuric acid Procedure: Similar to that in Example IV.

Products:
  Nonane, g _____ 76
  Naphthalene, g _____ 10
  MNN, g _____ 360
  DNN, g _____ 481
  Loss and holdup _____ 20
  DNN/nonene ratio _____ 0.95

EXAMPLE VIII

This example shows the effect of varying the amount of sulfuric acid in the alkylation of nonene with naphthalene under the following conditions: (1) 2 to 1 mole ratio of nonene to naphthalene and (2) presence of recycle MNN.

Charge:
  Nonene, g _____ 500
  Naphthalene, g _____ 255
  MNN, g _____ 310
  96.5% sulfuric acid _____ See Table II Procedure: Similar to that in Example IV.

Products: See Table II for yield of DNN.

TABLE II

*Yield of DNN vs. Parts $H_2SO_4$/Part Nonene*

| Run No. | g. $H_2SO_4$/ 500 g. Nonene | Parts $H_2SO_4$/Part Nonene | g. DNN/ g. Nonene |
|---|---|---|---|
| A | 164 | 0.33 | 0.32 |
| B | 300 | 0.60 | 0.70 |
| C | 400 | 0.80 | 0.74 |
| D | 500 | 1.00 | 0.76 |
| E | 600 | 1.20 | 0.83 |
| F | 700 | 1.40 | 0.96 |
| G | 800 | 1.60 | 1.02 |
| H | 900 | 1.80 | 1.05 |
| I | 1,000 | 2.00 | 1.06 |

EXAMPLE IX

This example shows (1) the operation of our process on a continuous basis and (2) the effect of an increased amount of sulfuric acid when recycling the MNN.

The apparatus used is that shown in the accompanying drawing and described previously herein. The charge is as follows:

| | Parts per hour |
|---|---|
| Nonene | 500 |
| Naphthalene | 255 |
| MNN | 310 |
| 96.5% sulfuric acid: | |
| Run A | 500 |
| Run B | 700 |

The yields are as follows:

| Run No. | Parts DNN/ Parts Nonene |
|---|---|
| A | 0.76 |
| B | 1.02 |

From the data presented in the examples and Table II, the following conclusions are apparent:

(1) Use of a solvent, e.g., hexane, is detrimental to the alkylation reaction. (Example III)

(2) A 2 to 1 mole ratio of nonene to naphthalene provides a greater yield of dialkylnaphthalene than a 3 to 1 mole ratio. (Examples VI and VII)

(3) MNN is always produced in the alkylation of nonene with naphthalene. (Examples I–IV)

(4) In the alkylation of MNN to DNN an increase in the amount of catalyst produces a greatly improved DNN/nonene ratio. (Example V)

(5) The alkylation of nonene with naphthalene in the absence of MNN produces about a 0.75 DNN/nonene ratio. (Example I)

(6) In the alkylation of nonene with naphthalene in the presence of MNN, an increase in the amount of sulfuric acid from 1.0 to 1.4 parts per part of nonene increases the yield of DNN from 0.76 gram per gram of nonene to 0.96 gram. (Example VIII and Table II; also, Examples IV and VII)

In summary, we have shown that the process of our invention (1) provides for the production of DNN in increased yield, (2) utilizes by-product MNN by recycling it to the reaction, and (3) uses, as a catalyst, sulfuric acid, which is economical and, if desired, may be recycled until becoming inactive; furthermore, we have shown that in order to utilize by-product MNN in our process the amount of sulfuric acid catalyst required is outside of the range normally used without the MNN recycle.

While particular embodiments of the invention have been described, it will be understood, of course, that the invention is not limited thereto, since many modifications may be made; and it is, therefore, contemplated to cover by the appended claims any such modifications as fall within the true spirit and scope of the invention.

The invention having thus been described, what is claimed and desired to be secured by Letters Patent is:

1. An improved process for the production of dinonylnaphthalene, said process comprising the steps of:
    (a) adding to a reaction vessel, while maintaining the temperature at 0 to 15° C., naphthalene, mononylnaphthalene in the amount of 0.20 to 4.0 parts (weight) per part of naphthalene, and sulfuric acid in the amount of 1.2 to 5.9 parts (weight) per part of naphthalene,
    (b) adding with stirring from 1 to 3 parts of nonene per part of naphthalene while maintaining the temperature at 0 to 15° C.
    (c) recovering from the reaction mixture, paraffinic hydrocarbon, naphthalene, mononylnaphthalene, and dinonylnaphthalene.

2. The process of claim 1 wherein the mononylnaphthalene of step (c) is recycled to step (a).

3. An improved process for the production of dinonylnaphthalene, said process comprising the steps of:
    (a) adding to a reaction vessel, while maintaining the temperature at 0 to 15° C., naphthalene, mononylnaphthalene in the amount of 0.20 to 4.0 parts (weight) per part of naphthalene, and sulfuric acid in the amount of 2.3 to 3.9 parts (weight) per part of naphthalene,
    (b) adding with stirring about 2 parts of nonene per part of naphthalene while maintaining the temperature at 0 to 15° C.
    (c) recovering from the reaction mixture a fraction boiling up to 175° C. at 1 atmosphere pressure (nonane), a fraction boiling between 175° C. at 1 atmosphere and 175° C. at 100 mm. Hg pressure (naphthalene), a fraction boiling between 175° C. at 100 mm. Hg pressure and 250° C. at 20 mm. Hg pressure (mononylnaphthalene), and a bottoms fraction, being the material not boiling at 250° C. at 20 mm. Hg pressure (dinonylnaphthalene).

4. The process of claim 3 wherein the mononylnaphthalene fraction of step (c) is recycled to step (a).

5. The process of claim 4 wherein the nonene is present in an amount of about 2 parts of nonene per part of naphthalene.

6. The process of claim 4 wherein the nonene is characterized as being produced by the polymerization of propene.

7. The process of claim 6 further characterized in that the nonene is produced by the polymerization of propene using phosphoric acid kieselguhr catalyst at about 400° F. and 1,000 p.s.i.g.

8. The process of claim 6 wherein the nonene is characterized as containing at least 40 percent (volume) $C_9$ hydrocarbons.

9. The process of claim 6 wherein the reaction is conducted within the temperature range of 5 to 10° C.

References Cited in the file of this patent

UNITED STATES PATENTS

| 2,316,108 | Ruthruff | Apr. 6, 1943 |
| 2,695,326 | Lippincott et al. | Nov. 23, 1954 |
| 2,819,324 | McCaulay et al. | Jan. 7, 1958 |
| 2,949,492 | Weaver | Aug. 16, 1960 |

UNITED STATES PATENT OFFICE
CERTIFICATE OF CORRECTION

Patent No. 3,076,857                 February 5, 1963

Robert L. Carden et al.

It is hereby certified that error appears in the above numbered patent requiring correction and that the said Letters Patent should read as corrected below.

Column 4, line 37, for "844" read -- 384 --; column 8, lines 12 and 13, for "mononylnaphthalene" read -- monononylnaphthalene --.

Signed and sealed this 3rd day of September 1963.

(SEAL)
Attest:

ERNEST W. SWIDER
Attesting Officer

DAVID L. LADD
Commissioner of Patents